G. H. RIVES.
ADJUSTABLE PEDAL EXTENSION.
APPLICATION FILED JUNE 12, 1920.
1,386,951.
Patented Aug. 9, 1921.
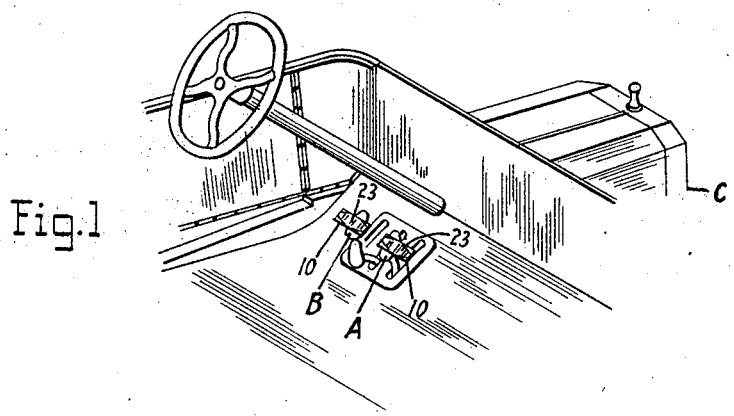
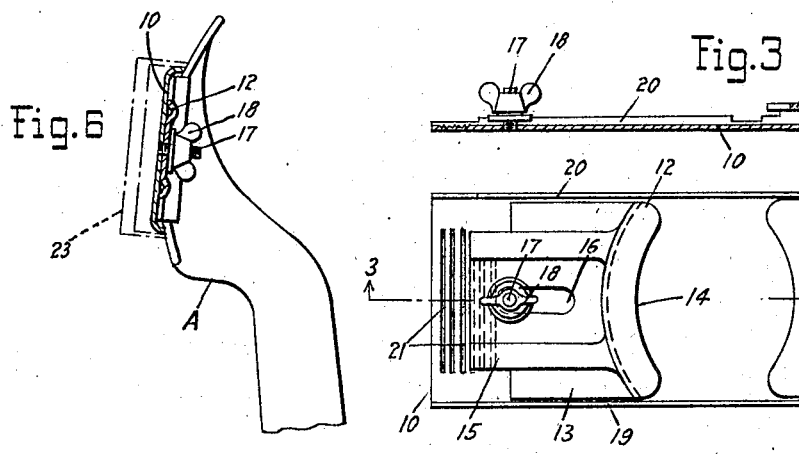
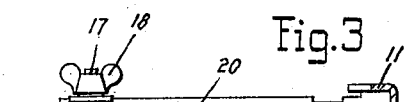
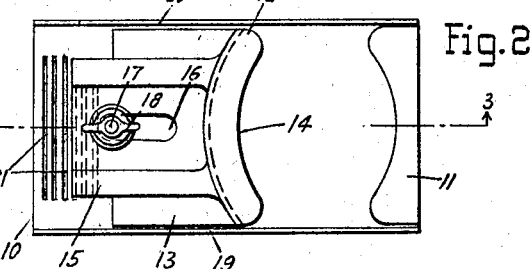
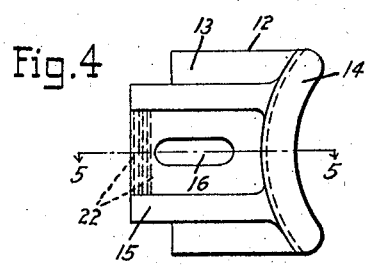
Inventor
George H. Rives
By his Attorney
W. T. Criswell.

UNITED STATES PATENT OFFICE.

GEORGE H. RIVES, OF NEW YORK, N. Y.

ADJUSTABLE PEDAL EXTENSION.

1,386,951.   Specification of Letters Patent.   Patented Aug. 9, 1921.

Application filed June 12, 1920. Serial No. 388,552.

*To all whom it may concern:*

Be it known that I, GEORGE H. RIVES, a citizen of the United States, and a resident of New York, in the county of New York and State of New York, have invented certain new and useful Improvements in an Adjustable Pedal Extension, of which the following is a full, clear, and exact specification.

This invention relates to a class of devices adapted to be used especially in conjunction with the foot pedals of automobiles and the like.

My invention has for its object primarily to provide an extension device designed to be applied to the foot plate of the pedal of an automobile, autotruck and like vehicle whereby the bearing surface for the foot of the chauffeur of the vehicle for operating the pedal may be arranged so that each pedal when a number are used may be separately operated without danger of accidentally operating the others as well as serving to prevent liability of occurrence of accidents by providing ample support for the foot. The invention contemplates mainly the provision of a plate having on one of its ends a hook member for removably engaging one of the side edges of the foot pedal of an automobile so that the plate will rest on the top of the pedal as well as extending in a lateral direction beyond the second side edge of the pedal. On the underside of the protruding second end of the plate is a slidable clip which is adjustable for removably engaging the second side edge of the pedal, and associated with the plate and clip is a locking element for releasably locking the plate and clip together.

Other objects of the invention are to provide on the plate stops to prevent lateral shifting of the clip when locked to the plate; to provide on the plate and clip coacting teeth for preventing the clip from slidable movement back and forth between the stops when locked to the plate; and to provide an adjustable extension device which may be made in any suitable size and shape for use on automobile foot pedals of various types.

With these and other objects in view, the invention will be hereinafter more fully described with reference to the accompanying drawing forming a part of this specification in which similar characters of reference indicate corresponding parts in all the views, and will then be pointed out in the claims at the end of the description.

In the drawing, Figure 1 is a fragmentary view showing part of an automobile with forms of adjustable pedal extensions embodying my invention applied to a number of the foot pedals of the vehicle.

Fig. 2 is an enlarged inverted plan of the device.

Fig. 3 is an enlarged detail sectional view taken on the line 3—3 of Fig. 2 with the slidable clip removed therefrom.

Fig. 4 is a plan of the slidable clip.

Fig. 5 is a detail sectional view taken on the line 5—5 of Fig. 4, and

Fig. 6 is an enlarged fragmentary view showing a side elevation of the foot pedal of an automobile with the device applied thereto, the latter being shown in cross section and partly in detail.

The device or pedal extension has a plate 10 which may be of any suitable shape and size, though the form of the plate illustrated is substantially rectangular. In practice one of these plates is arranged upon the foot plate of the brake pedal and clutch pedal, as A and B, of an automobile, autotruck or other like vehicle, as C, when of a type having such a number of foot pedals. On one end of the plate 10 is a hook member or catch 11 which is preferably provided by bending the end of the plate downwardly and then inwardly in spaced relation to the underside of the plate so that the plate when applied to the pedal may be arranged for the hook member to be disposed in overlapping engagement with one of the side edges of the pedal. The plate is of a length so that its second end protrudes laterally some distance beyond the second side edge of the pedal, and coacting with the hook member 11 to removably lock the plate to the pedal on the underside of the plate 10 is a slide or movable clip, as 12.

The slidable clip 12 is preferably of a form having a flat body part, as 13, which is of considerably less length than the length of the plate 10, while being of a width slightly less than the width of the plate. On one end of the body part 13 is a hook member, as 14, which may be provided by bending the body part downwardly and forwardly toward the entrance to the hook member 11 of the plate 10. The entrances of the members 11 and 14 are thereby in opposed relation. When the plate 10 is arranged on the foot pedal so that the hook member 11 engages one of the side edges of the pedal the clip 12 is slidably adjusted on the plate so that the hook member 14 engages in overlapping arrangement the second side edge of the pedal, and projecting from the second end of the body part 13 of the clip may be an extension, as 15. In order to releasably fasten the clip 12 to the plate 10 when the hook members 11 and 14 are in engagement with the foot pedal, in the body part 13 of the clip as well as in the extension 15 is a slot 16, and protruding through this slot from the underside of the plate 10 is a fixed threaded bolt 17 having a wing nut on its threaded free end so that by screwing the nut accordingly it will engage the clip 12 for releasing or tightening the clip and plate together.

Serving to prevent the clip 12 from lateral movement on the plate 10, projecting downwardly from the underside of the plate are two stops, as 19 and 20, both of which may be in the forms of flanges provided by bending the lengthwise edges of the plate downwardly alongside of the side edges of the clips. These stops or flanges are of widths so that they extend below the clips, and the stops are spaced apart to allow free slidable movement of the clip back and forth toward and from the hook member 11 of the plate 10, while preventing all tendency to accidentally shift laterally.

On the underside of the plate 10 at its end opposite to the hook member 11 may be one or more rows of teeth, as 21, and on the face of the extensions 15 of the clip 12 in opposition to the teeth may also be provided one or more rows of teeth 22 which are arranged so that when the clip is releasably locked to the plate 10 the teeth of the clip will engage the teeth 21 of the plate 10, and the clip will thereby be prevented from accidental movement back and forth relative to the hook member 11 when the device is clamped on the foot pedal. On the top of the plate 10 may be provided a pad or cushion, as 23, of rubber or other resilient material if desired, and this pad may be of any suitable type, such as the form of pad disclosed in my Patent No. 1,177,808. Thus a simple and efficient device is provided for use on the foot pedals of automobiles, autotrucks and like vehicles whereby the bearing surface of the pedal for the foot of the operator of the vehicle may be extended as well as being arranged so that the pedal may at all times be quickly and positively operated without danger of interfering with the other foot pedals when the vehicle is equipped with a number of the pedals.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

1. An adjustable pedal extension, comprising a plate having on one of its ends a hook member adapted to removably engage one edge of a foot pedal so that the plate will rest upon top of the pedal and said plate being of a length so that its second end part protrudes beyond the second side edge of the pedal, spaced stops depending downwardly from said second end part of plate, teeth on the underside of the plate between the stops, a clip slidably movable on the plate between the stops toward and from the hook member for detachably engaging the second side edge of the pedal when the clip is accordingly adjusted, and means for releasably locking the plate and clip when adjusted in engagement with the pedal.

2. An adjustable pedal extension, comprising a plate having on one of its ends a hook member adapted to removably engage one edge of a foot pedal so that the plate will rest upon top of the pedal and said plate being of a length so that its second end part protrudes beyond the second side edge of the pedal, spaced stops depending downwardly from said second end part of plate, teeth on the underside of the plate between the stops, a clip slidably movable on the plate between the stops toward and from the hook member for detachably engaging the second side edge of the pedal when the clip is accordingly adjusted, means for releasably locking the plate and clip when adjusted in engagement with the pedal, and teeth on the clip, adapted to engage the teeth of said plate when the clip and plate are locked together.

3. An adjustable pedal extension, comprising a plate having on one of its ends a hook member adapted to removably engage one edge of a foot pedal so that the plate will rest upon top of the pedal and said plate being of a length so that its second end part protrudes beyond the second side edge of the pedal, spaced stops depending downwardly from said second end part of plate, teeth on the underside of the plate between the stops, a slide element movable on the plate between the stops toward and from the hook member, a hook member protruding from the slide element for detachably engaging the second side edge of the pedal when the slide element is accordingly adjusted, and means for releasably locking the plate and slide element with its hook member when adjusted in engagement with the pedal.

4. An adjustable pedal extension, comprising a plate having on one of its ends a hook member adapted to removably engage one edge of a foot pedal so that the plate will rest upon top of the pedal and said plate being of a length so that its second end part protrudes beyond the second side edge of the pedal, spaced stops depending downwardly from said second end part of plate, teeth on the underside of the plate between the stops, a slide element movable on the plate between the stops toward and from the hook member, a hook member protruding from the slide element for detachably engaging the second side edge of the pedal when the slide element is accordingly adjusted, means for releasably locking the plate and slide element with its hook member when adjusted in engagement with the pedal, and teeth on the slide element, adapted to engage the teeth of said plate when the slide element and plate are locked together.

This specification signed and witnessed this 11th day of June, A. D. 1920.

GEORGE H. RIVES.

Witness:
FREDERICK CRYER.